(12) United States Patent
Juang et al.

(10) Patent No.: US 6,248,169 B1
(45) Date of Patent: Jun. 19, 2001

(54) DUAL-CUP COATING APPARATUS

(75) Inventors: Deng-Guey Juang, Hsinchu; Wen-Jye Chung, Hsin-Chu, both of (TW)

(73) Assignee: Taiwan Semiconductor Manufacturing Company, Ltd., Hsin Chu (TW)

( * ) Notice: Subject to any disclaimer, the term of this patent is extended or adjusted under 35 U.S.C. 154(b) by 0 days.

(21) Appl. No.: 09/324,433

(22) Filed: Jun. 1, 1999

(51) Int. Cl.[7] ..................................... B05C 5/02
(52) U.S. Cl. ................. 118/52; 118/56; 118/319; 118/320; 118/323; 118/326
(58) Field of Search ................. 118/52, 56, 319, 118/320, 323, 326

(56) References Cited

U.S. PATENT DOCUMENTS 5,514,214 * 5/1996 Joel et al. .................... 118/52
5,540,772 * 7/1996 McMillan et al. ............. 118/52
6,053,977 * 4/2000 Konishi ....................... 118/52

* cited by examiner

*Primary Examiner*—Laura Edwards
(74) *Attorney, Agent, or Firm*—Tung & Associates

(57) ABSTRACT

A liquid coating apparatus that is adapted for dispensing two or more different liquids and a method for using such apparatus are disclosed. In the apparatus, when two different liquids are dispensed in the same coating apparatus, two separate drain cups are utilized in which an upper drain cup is constructed in a toroidal shape and formed in two symmetrical halves such that they may be withdrawn from an operating position outwardly to allow a wafer platform and a liquid spray nozzle to be lowered into a lower drain cup for dispensing a second liquid material. The lower drain cup can be mounted concentrically with the upper drain cup. The present invention novel apparatus allows at least two different liquids to be processed in the same coating apparatus such that chemical reactions between the different liquids and the resulting particle formation and contamination problems can be avoided.

15 Claims, 2 Drawing Sheets

DUAL-CUP COATING APPARATUS

FIELD OF THE INVENTION

The present invention generally relates to a liquid coating apparatus and a method for using and more particularly, relates to a dual-cup spin coating apparatus that is equipped with an upper and a lower drain cup wherein the upper drain cup is constructed in two halves which can be moved outwardly to allow a wafer pedestal to be lowered into a lower drain cup for performing a second liquid coating operation and a method for using such apparatus.

BACKGROUND OF THE INVENTION

In the manufacturing processes for integrated circuits, a lithography process is frequently used for reproducing circuits and structures on a semiconductor substrate. As a first step in a lithography process, a photoresist layer is first coated onto a semiconductor substrate such that an image can be projected and developed on the substrate. The photoresist material is a liquid that is coated in a very thin layer on top of the semiconductor substrate. In a conventional process for applying a photoresist coating material to a semiconductor substrate, a spin coating apparatus is normally used. The spin coating apparatus is a sealed chamber constructed by an upper compartment, a lower compartment and a circular-shaped, rotating platform that has a diameter slightly smaller than the diameter of a semiconductor substrate. The rotating platform is a vacuum chuck since vacuum is applied to the platform for holding the semiconductor substrate securely during a spin coating process. The rotating platform is positioned in the coating machine such that a semiconductor substrate may be placed on top horizontally. During the coating process, the bottom or the uncoated surface of a semiconductor substrate contacts the rotating platform. A suitable vacuum is then applied to the bottom surface of the substrate such that it stays securely on the vacuum chuck even at high rotational speed. The rotating motion of the vacuum chuck is achieved by a shaft which is connected to the vacuum chuck and powered by a motor.

In a typical photoresist coating process, a desirable amount of a liquid photoresist material is first applied to a top surface of the semiconductor substrate from a liquid dispenser that is mounted on a track while the substrate is rotated at a low speed on the vacuum chuck. The photoresist liquid spread radially outward from the center of the semiconductor substrate where it is applied towards the edge of the semiconductor substrate until the entire top surface of the substrate is covered with a thin layer. Excess photoresist liquid spun off the rotating wafer during the photoresist coating process. The rotational speed of the vacuum chuck and the amount of the photoresist liquid applied at the center of the semiconductor substrate can be determined and adjusted prior to and during an application process such that a predetermined, desirable thickness of the photoresist is obtained. The rotational speed of the vacuum chuck is normally increased at the end of the application process to ensure that the entire surface of the substrate is evenly coated with the photoresist material.

A conventional apparatus for coating photoresist on a semiconductor substrate is shown in FIG. 1. The apparatus 10 consists of a drain cup 12 and a rotating platform 20, i.e., a vacuum chuck, positioned at the center of the drain cup for supporting a semiconductor substrate 26 positioned on a top surface 24 of the vacuum chuck 20. The vacuum chuck can be rotated by a shaft 32 which is connected to an electric motor (not shown). The drain cup 12 is provided with a spent photoresist drain pipe 34. The spent photoresist drain pipe 34 is used to drain away photoresist liquid that spun off the substrate during a coating operation.

In the operation of the conventional coater 10 of FIG. 1, the vacuum chuck 20 is first loaded with a semiconductor substrate 26 on top. A liquid dispenser 18 then approaches the center of the substrate 26 and applies a predetermined amount of a liquid photoresist material to the center of the substrate. The vacuum chuck 20 then starts spinning to spread out the photoresist material to evenly cover the top surface 24 of the substrate 26. Extra photoresist material is thrown off the substrate surface and drained away by the drain pipe 34.

When a lithographic process is carried out on a photoresist layer, any foreign particles or defects in the pattern formed on the photoresist layer act as extra etch mask and are reproduced on the substrate surface. Certain types of these extra resist pattern have been identified as originating from the photoresist coating process, i.e., photoresist powder or gel that bounces back onto the substrate surface during the high speed spinning step of the coating process. The extra resist pattern on the substrate surface causes serious defects in the substrate and thus, greatly reduces the yield of the chip fabrication process.

In certain fabrication processes for IC devices, a series of photoresist coatings are applied on top of a wafer in order to fabricate the device. For instance, a series of photoresist coatings such as a bottom anti-reflective coating (BARC), a photoresist coating and a top antireflective coating (TARC) are frequently deposited on a semiconductor structure for defining a specific feature of the circuit. After the photolithographic process is completed, a solvent is used in an edge-rinse process for removing any residual coating material from the edge of the wafer. The photoresist material used in the BARC and TARC are frequently the same. However, they are different than the material used for the photoresist layer sandwiched in the middle. The solvent utilized is also a completely different chemical than that used in the photoresist layer.

In a conventional semiconductor fabrication process, at least two or three spin coating chambers must be used to coat the different photoresist materials in order to avoid the mixing of the different types of photoresist liquids resulting in chemical reaction and the generation of debris or particles in the reaction. The debris or particles generated present a serious contamination problem to the wafer. Furthermore, the mixing and the resulting chemical reaction between the different types of photoresist liquids and the solvent further clogs the drain pipe for the drain cup that surrounds the wafer. This leads to further contamination problems.

It is therefore an object of the present invention to provide liquid coating apparatus for processing different types of photoresist liquids without the drawbacks and shortcomings of the conventional liquid coating apparatus.

It is another object of the present invention to provide a liquid coating apparatus that is adapted for dispensing two different liquids without causing contamination problems.

It is a further object of the present invention to provide a liquid coating apparatus that is adapted for dispensing two different liquids without contamination problems by utilizing two separate drain cups.

It is another further object of the present invention to provide a liquid coating apparatus that utilizes two separate drain cups mounted concentrically with one on top of the other.

It is still another object of the present invention to provide a spin coating apparatus that utilizes an upper drain cup and a lower drain cup mounted concentrically wherein the upper drain cup is constructed in two halves adapted for outward movement to allow a wafer chuck to be lowered into the lower drain cup for performing a second coating step.

It is yet another object of the present invention to provide a spin coating apparatus adapted for dispensing two different liquids by utilizing an upper drain cup and a lower drain cup mounted concentrically wherein the upper drain cup may be moved out of the way by robot arms.

It is still another further object of the present invention to provide different liquids in the same spin coating apparatus by utilizing an upper drain cup and a lower drain cup mounted concentrically to perform a first coating step in the upper drain cup, followed by removing the upper drain cup outwardly such that a wafer chuck may be lowered into the lower drain cup for performing the second coating step.

It is yet another further object of the present invention to provide a spin coating apparatus for sequentially dispensing two different liquids on a wafer surface which includes an upper drain cup and a lower drain cup each adapted for handling a different liquid wherein the upper drain cup is operated by robot arms for outward movement of the two halves in order to operate the lower drain cup for the second coating process.

SUMMARY OF THE INVENTION

In accordance with the present invention, a liquid coating apparatus adapted for dispensing two different liquids and a method for using such apparatus are provided.

In a preferred embodiment, a liquid coating apparatus that is adapted for dispensing two different liquids without contamination problems can be provided which includes a liquid dispensing nozzle for dispensing a first liquid and a second liquid, a substrate platform for supporting a substrate thereon, a shaft connected to the substrate platform for upward, downward and rotational movement of the platform, an upper drain cup in a toroidal shape formed in two halves intimately engaging each other along a center line for draining a first liquid, each of the two halves of the toroidal-shaped upper drain cup is supported by a robot arm for inward and outward movements for allowing the substrate platform to be lowered from an upper position to a lower position when the two halves are moved outwardly by the robot arms, and a lower drain cup in a toroidal shape mounted substantially concentrically with and below the upper drain cup for draining a second liquid.

In the liquid coating apparatus adapted for dispensing two different liquids, the apparatus may be a spin coating machine for dispensing two different photoresist compositions. The platform and the shaft may be integrally formed. The two halves of the upper drain cup each may be equipped with a drain pipe. The lower drain cup may also be equipped with a drain pipe. The platform supports the substrates by a vacuum force. The first and second liquids chemically reacts when mixed. The liquid dispensing nozzle may be equipped with means for moving downwardly onto the substrate platform when the platform is moved into the lower position. The shaft may be connected to a motor for the upward, downward and rotational motions. The apparatus may further include a process controller for controlling motions of the liquid dispensing nozzle, the substrate platform and the upper drain cup.

The present invention is further directed to a method for coating a substrate with two different liquids in the same coating apparatus that can be carried out by the operating steps of providing a liquid dispensing nozzle for dispensing a first and a second liquid, providing a substrate platform connected to a shaft for upward, downward and rotational movement, mounting an upper drain cup formed in toroidal shape in two halves intimately mated at a center line and supported by two robot arms at an upper position, mounting a lower drain cup at a lower position concentric with the upper drain cup, loading a substrate on the substrate platform and dispensing the first liquid on a top surface of the substrate, forming a first film, moving the two halves of the upper drain cup sufficiently outwardly by the robot arms for the substrate platform and the substrate to move into the lower drain cup, lowering the substrate platform and the substrate to the lower drain cup, and dispensing the second liquid on top of the first film and the substrate.

The method for coating a substrate with two different liquids in the same coating apparatus may further include the step of sequentially depositing a first liquid of a bottom anti-reflective coating and a second liquid of a photoresist material. The method may further include the step of rotating the substrate platform during the step of dispensing the first and the second liquid. The method may further include the step of securely mounting a substrate on the substrate platform by vacuum means. The method may further include the step of lowering the liquid dispensing nozzle into the lower drain cup after the step of lowering the substrate platform and the substrate into the lower drain cup. The method may further include the step of draining the two halves of the upper drain cup of the first liquid through a drain pipe. The method may further include the step of draining the lower drain cup of the second liquid through a drain pipe.

In an alternate embodiment, a spin coating apparatus for sequentially dispensing two different liquids on a wafer is provided which includes a liquid dispensing nozzle adapted for dispensing a first and a second liquid, a wafer chuck for holding a wafer thereon and for moving upwardly and downwardly into and out of an upper drain cup, an upper drain cup in a toroidal shape formed in two halves removably joined together along a center line for collecting a first liquid, electromechanical means for moving the two halves of the upper drain cup inwardly toward the wafer chuck or outwardly away from the wafer chuck to allow the upward and downward motions of the wafer chuck, and a lower drain cup in a toroidal shape mounted substantially concentrically below the upper drain cup for collecting a second liquid.

In the spin coating apparatus for sequentially dispensing two different liquids on a wafer, the two halves of the upper drain cup each is equipped with a drain pipe for draining the first liquid collected. The lower drain cup may similarly be equipped with a drain pipe for draining the second liquid collected. The wafer chuck may be a vacuum chuck. The liquid dispensing nozzle may further be equipped with means for moving downwardly into the lower drain cup. The wafer chuck may further include motor means for rotating the chuck during dispensing of the first and the second liquid. The apparatus may further include a process controller for controlling motions of the liquid dispensing nozzle, the wafer chuck and the upper drain cup.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses a liquid coating apparatus that is adapted for dispensing two or more different liquids in the same apparatus without chemical mixing and reaction problems which frequently lead to contamination on the wafer. In the present invention liquid coating apparatus, at least two drain cups are provided for handling at least two different liquid coating materials. When two different materials are utilized, an upper drain cup and a lower drain cup are provided. Similarly, when three different liquid coating materials are utilized, three separate drain cups in a stacked up-and-down position mounted concentrically may be provided.

In the dual-drain cup apparatus of the present invention, an upper drain cup is provided in a toroidal shape and formed in two symmetrical halves that intimately engage each other along a center line. The two halves of the upper drain cup are each operated by a robot arm for inward movement toward a wafer platform during a liquid dispensing process, and for outward movement after the liquid dispensing process is completed such that the upper drain cup can be completely moved out of the way for the wafer platform and the liquid dispensing nozzle to be lowered into a lower drain cup for performing a second liquid coating operation.

While the present invention method is illustrated by an example utilizing photoresist coating liquids, the method may be suitably used for any other liquid coating compositions that are utilized in semiconductor processing. For instance, the method and apparatus may be suitably used for coating of a spin-on-glass (SOG) material and for an edge rinse step after the SOG coating process. In the specific illustration for utilizing the present invention novel apparatus, three different photoresist coating materials are sequentially coated on a semiconductor wafer for performing a photolithographic process. In this method, a bottom anti-reflective coating (BARC) layer, a photoresist coating layer and a top anti-reflective coating (TARC) layer are sequentially deposited in a photolithographic process. The BARC and the TARC photoresist layers may be formed of the same material such that a dual-cup design of the present invention spin coating apparatus may be utilized to handle two different coating materials, i.e., the BARC/TARC liquid and the photoresist liquid, in the same coating apparatus.

Figure 1:
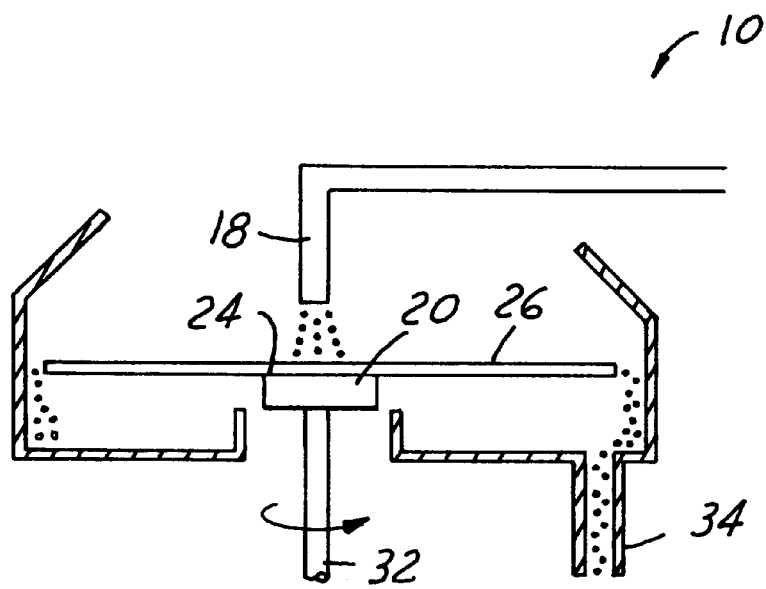
FIG. 1 is an illustration of a conventional spin coating apparatus utilizing a single drain cup and a liquid dispensing nozzle.
Figure 4:
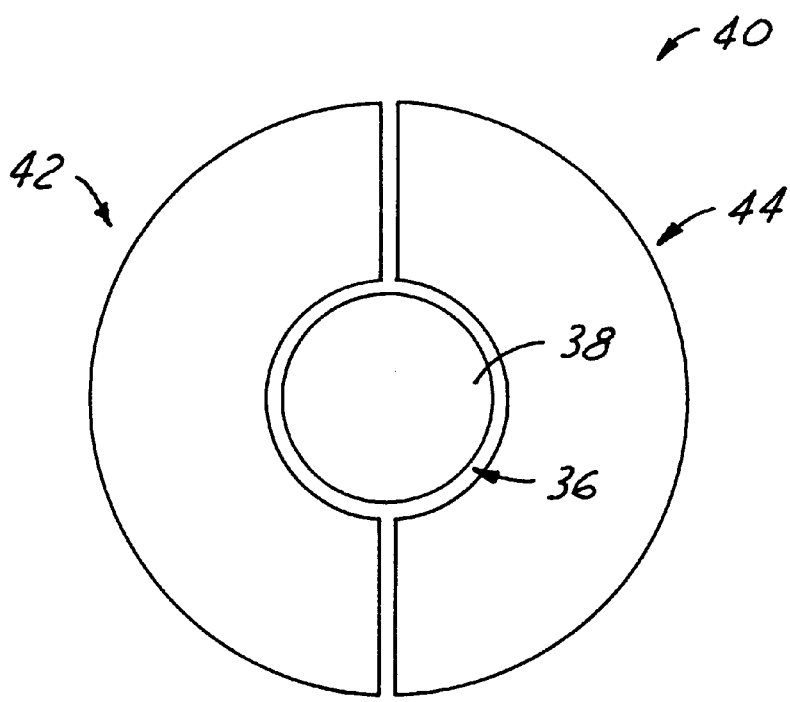
FIG. 4 is a plane view of the upper drain cup and the wafer platform.
Figure 2:
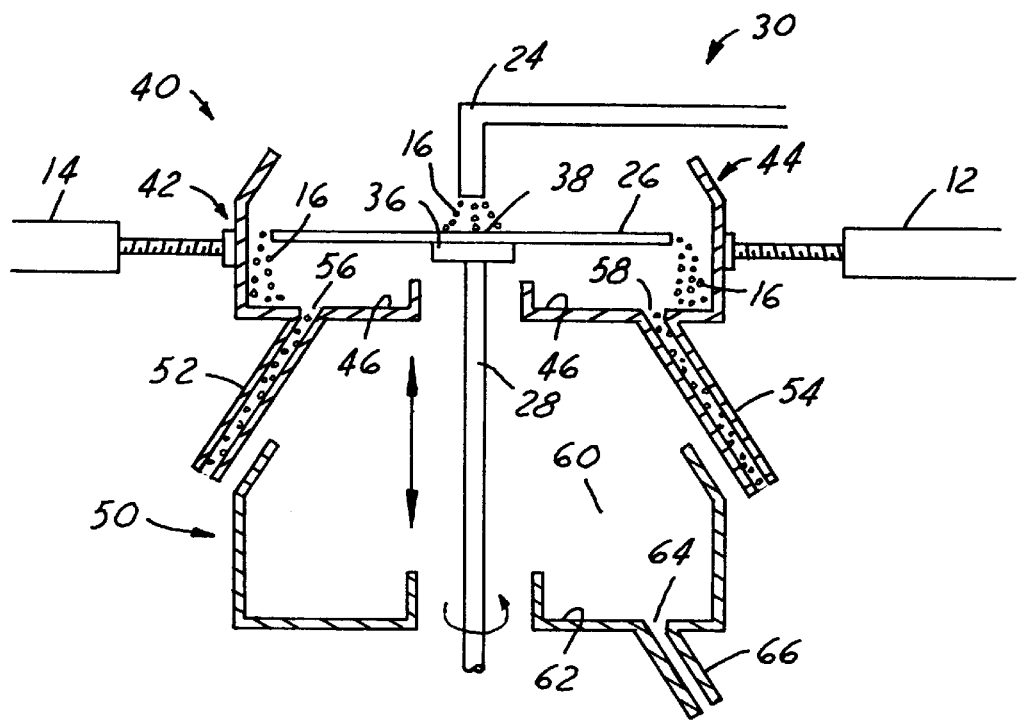
FIG. 2 is an illustration of the present invention spin coating apparatus utilizing an upper drain cup and a lower drain cup with the upper drain cup in operating condition.

Referring initially to FIG. 2 wherein a present invention novel apparatus 30 is shown. The spin coating apparatus 30 of the present invention is constructed by an upper drain cup 40 and a lower drain cup 50. The upper drain cup 40 and the lower drain cup 50 are mounted concentrically on the same center axis with the upper drain cup formed in two symmetrical halves 42, 44. This is shown in FIG. 4. A wafer platform 36 which has a top surface 38 for holding a semiconductor wafer 26 thereon is also shown. The upper drain cup 40 is formed in two halves 42, 44 that are each supported and operated by a robot arm 12, 14 for inward and outward movement of the two halves.

FIG. 2 illustrates a present invention novel method wherein a first coating liquid 16 is applied to the wafer 26 from a liquid spray nozzle 24. During the liquid coating process, the wafer pedestal 36 may be rotated at a slow rotational speed such as 5~10 rpm by shaft 28. The wafer pedestal 36 may also be left at a stationary condition when the liquid coating material 16 is first dispensed in droplets at the center of wafer 26. After the liquid coating material 16 is dispensed at the center of the wafer 26, the wafer platform 36 is rotated by shaft 28 at a high rotational speed such as between 100 rpm and 1,000 rpm to spread out evenly the coating material on the entire surface of the wafer 26. Excess liquid coating material 16 is spun off the wafer surface and collected at the bottom 46 of the upper drain cup 40. Two separate drain pipes 52, 54 are provided for connecting to the two halves 42, 44 of the upper drain cup 40 through drain outlets 56, 58. After the excess liquid coating material 16 is collected on the bottom 46 of the upper drain cup 40 and drained away by the drain pipes 52, 54, the first coating process is completed and the rotation of the wafer platform 36 is stopped.

In the next step of the present invention novel method, robotic arms 12, 14 are used to move the two halves 42, 44 of the upper drain cup 40 outwardly away from the wafer pedestal 36 and the wafer 26. The wafer pedestal 36 is then lowered by a motor means (not shown) together with the liquid spray nozzle 24 into cavity 60 of the lower drain cup 50. After the wafer pedestal 36 and the liquid spray nozzle 24 are properly positioned in cavity 60, the second coating material 22, which is different than the first coating material 16, is sprayed on the top surface 26 over the first coating layer 16. Similarly, the wafer platform 36 may either be rotating at a low rpm or held stationary during the initial dispensing, when liquid coating material 22 is dropped at the center of the wafer 26. The wafer platform 36 is then rotated at a high rpm between 100~1,000 rpm to spread out the liquid coating material 22 to evenly cover the top surface of wafer 26. Excess second coating material 22 is spun off the wafer surface and collected at the bottom 62 of the lower drain cup 50. The excess coating material 22 is then drained away from drain outlet 64 by a drain pipe 66. The drained away coating material may either be recycled or be disposed of as waste material.

Figure 3:
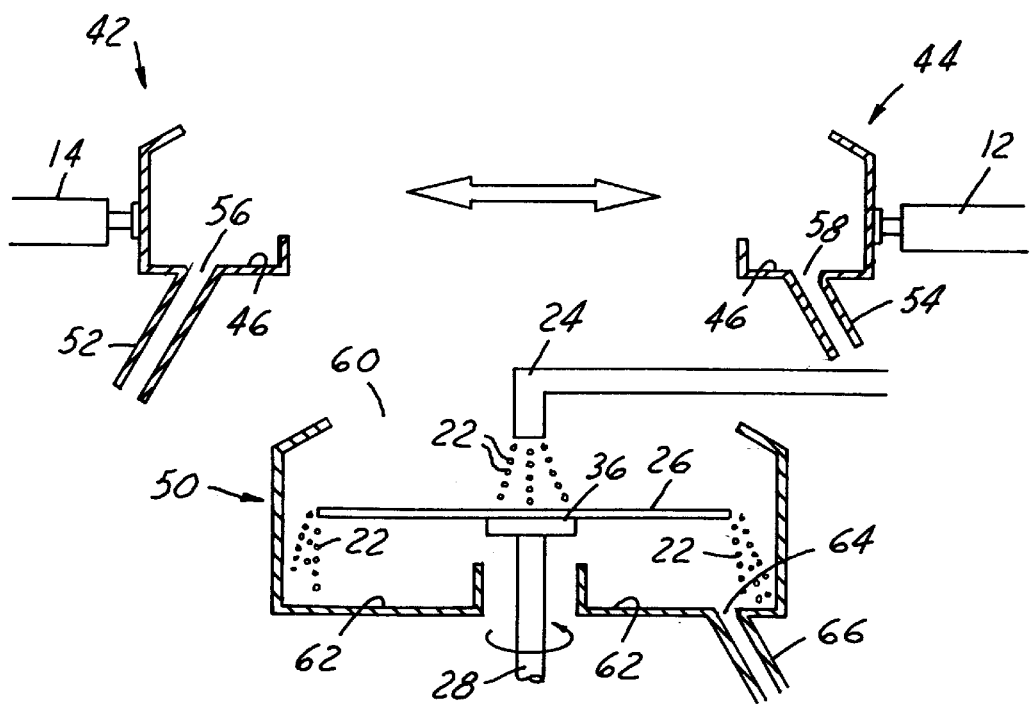
FIG. 3 is an illustration of the present invention spin coating apparatus of FIG. 2 with the upper drain cup moved outwardly by robot arms to allow the wafer platform and the liquid spray nozzle to be lowered into the lower drain cup to perform the second coating step.

It should be noted that in FIGS. 2, 3 and 4, a preferred embodiment of the present invention novel apparatus which consists of only two drain cups is shown. Other possible embodiment of the present invention such as a three-drain cup design or even four-drain cup design may further be provided by utilizing the same desirable features of the preferred embodiment shown in FIGS. 2~4. In such designs, the upper drain cups are operated by a series of robot arms similar to that shown in the preferred embodiment.

The present invention novel method and apparatus have therefore been amply described in the above descriptions and in the appended drawings of FIGS. 2, 3 and 4.

While the present invention has been described in an illustrative manner, it should be understood that the terminology used is intended to be in a nature of words of description rather than of limitation.

Furthermore, while the present invention has been described in terms of a preferred and alternate embodiments, it is to be appreciated that those skilled in the art will readily apply these teachings to other possible variations of the inventions.

The embodiment of the invention in which an exclusive property or privilege is claimed are defined as follows:

1. A liquid coating apparatus adapted for dispensing two different liquids comprising:

a liquid dispensing nozzle for dispensing a first and a second liquid, a shaft connected to a substrate platform for upward, downward and rotational movement of said platform, an upper drain cup in a toroidal shape formed in two halves intimately engaging each other along a center line for draining said first liquid, each of said two halves of the toroidal shaped upper drain cup is equipped with a drain pipe and supported by a robot arm for inward and outward movement for allowing said substrate platform to be lowered from an upper position to a lower position when said two halves are moved outwardly by said robot arms, and a lower drain cup in a toroidal shape mounted substantially concentrically with and below said upper drain cup for draining said second liquid.

2. A liquid coating apparatus adapted for dispensing two different liquids according to claim 1, wherein said apparatus is a spin coating machine for dispensing two different photoresist compositions.

3. A liquid coating apparatus adapted for dispensing two different liquids according to claim 1, wherein said platform and said shaft are integrally formed.

4. A liquid coating apparatus adapted for dispensing two different liquids according to claim 1, wherein said lower drain cup being equipped with a drain pipe.

5. A liquid coating apparatus adapted for dispensing two different liquids according to claim 1, wherein said platform supports said substrate by a vacuum force.

6. A liquid coating apparatus adapted for dispensing two different liquids according to claim 1, wherein said first and second liquid chemically reacts when mixed.

7. A liquid coating apparatus adapted for dispensing two different liquids according to claim 1, wherein said liquid dispensing nozzle being equipped with means for moving downwardly onto said substrate platform when said platform is moved into said lower position.

8. A liquid coating apparatus adapted for dispensing two different liquids according to claim 1, wherein said shaft being connected to a motor for said upward, downward and rotational motions.

9. A liquid coating apparatus adapted for dispensing two different liquids according to claim 1 further comprising a process controller for controlling motions of said liquid dispensing nozzle, said substrate platform and said upper drain cup.

10. A spin coating apparatus for sequentially dispensing two different liquids on a wafer comprising:

a liquid dispensing nozzle adapted for dispensing a first and a second liquid, a wafer chuck for holding a wafer thereon and for moving upwardly and downwardly into and out of an upper drain cup, an upper drain cup in a toroidal shape formed in two halves removably joined together along a center line for collecting said first liquid, said two halves of said upper drain cup each being equipped with a drain pipe for draining said first liquid collected, electromechanical means for moving said two halves of the upper drain cup inwardly toward said wafer chuck or outwardly away from said wafer chuck to allow said upward and downward motions of the wafer chuck, and a lower drain cup in a toroidal shape mounted substantially concentrically with and below said upper drain cup for collecting said second liquid.

11. A spin coating apparatus for sequentially dispensing two different liquids on a wafer according to claim 10, wherein said lower drain cup being equipped with a drain pipe for draining said second liquid collected.

12. A spin coating apparatus for sequentially dispensing two different liquids on a wafer according to claim 10, wherein said wafer chuck being a vacuum chuck.

13. A spin coating apparatus for sequentially dispensing two different liquids on a wafer according to claim 10, wherein said liquid dispensing nozzle being equipped with means for moving downwardly into said lower drain cup.

14. A spin coating apparatus for sequentially dispensing two different liquids on a wafer according to claim 10, wherein said wafer chuck further comprises motor means for rotating the chuck during dispensing of said first and second liquid.

15. A spin coating apparatus for sequentially dispensing two different liquids on a wafer according to claim 10 further comprising a process controller for controlling motions of said liquid dispensing nozzle, said wafer chuck and said upper drain cup.

* * * * *